United States Patent
Szwarc et al.

(10) Patent No.: US 10,599,412 B2
(45) Date of Patent: Mar. 24, 2020

(54) OPERATING SYSTEM INSTALLATION ON A COMPUTING DEVICE WITH MULTIPLE REDUNDANT DRIVES

(71) Applicant: MASTERCARD INTERNATIONAL INCORPORATED, Purchase, NY (US)

(72) Inventors: Wesley Alan Szwarc, Moscow Mills, MO (US); Gerard Tierney, O'Fallon, MO (US)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 16/051,330

(22) Filed: Jul. 31, 2018

(65) Prior Publication Data

US 2020/0042300 A1    Feb. 6, 2020

(51) Int. Cl.
*G06F 9/445* (2018.01)
*G06F 8/61* (2018.01)
*G06F 11/16* (2006.01)
*G06F 3/06* (2006.01)

(52) U.S. Cl.
CPC ............ *G06F 8/61* (2013.01); *G06F 3/0605* (2013.01); *G06F 3/0632* (2013.01); *G06F 3/0689* (2013.01); *G06F 11/1662* (2013.01)

(58) Field of Classification Search
CPC ..... G06F 8/61; G06F 8/63; G06F 8/60; G06F 8/71; G06F 8/65
USPC .................................................. 717/168, 175
See application file for complete search history.

(56) References Cited

U.S. PATENT DOCUMENTS

2005/0071837 A1* 3/2005 Butt .................. G06F 8/65
717/168

* cited by examiner

*Primary Examiner* — Chuck O Kendall

(57) ABSTRACT

The disclosure herein describes installing operating system (OS) software on a computing device with multiple drives. An interruption process associated with a redundant drive array is initiated by a processor. The redundant drive array includes a primary drive mirrored with a backup drive. An installation process associated with the operating system to be installed on the computing device is initiated by the processor. Upon detecting creation of a file system during the installation process, the interruption process disables the backup drive from the redundant drive array. Upon completion of the installation of the operating system on the primary drive by the installation process, the backup drive is re-enabled in the redundant drive array. After being re-enabled, the backup drive is synchronized with the primary drive. The installation process is made faster and more efficient by preventing repeated synchronization between the redundant drives during the process.

20 Claims, 5 Drawing Sheets

OPERATING SYSTEM INSTALLATION ON A COMPUTING DEVICE WITH MULTIPLE REDUNDANT DRIVES

BACKGROUND

Installing operating system (OS) software on computing devices that have high uptime and reliability requirements results in challenges that must be addressed. Installing the OS software may require that the computing device be rebooted several times, resulting in significant downtime. Further downtime may be incurred when the device is in the midst of an installation process when unnecessary programs or processes interrupt or otherwise slow installation process. For instance, installing an OS on a computing device that includes multiple redundant drives may result in the redundant drives being synchronized one or more times throughout the installation process, ultimately increasing the time required to complete the installation. Additionally, other features, such as power saving modes that may reduce access to various resources of the computing device to save power, may be counterproductive during installation of the OS. Installing an OS quickly and efficiently on the system is a high priority for maintaining uptime and reliable functionality on computing devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for installing operating system (OS) software on a computing device with multiple redundant drives is described. An interruption process associated with a redundant drive array is initiated by a processor. The redundant drive array includes a primary drive mirrored with a backup drive. An installation process associated with the operating system to be installed on the computing device is initiated by the processor. Upon detecting creation of a file system during the installation process, the interruption process disables the backup drive from the redundant drive array. Upon completion of the installation of the operating system on the primary drive by the installation process, the backup drive is re-enabled on the redundant drive array. After being re-enabled, the backup drive is synchronized with the primary drive.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a system and method for installing operating system (OS) software on a computing device with multiple redundant drives. The computing device is configured to use a primary drive and a backup drive mirrored on a redundant drive array. When the installation begins, an interruption process associated with the redundant drive array is initiated and an installation process associated with the OS to be installed is initiated to execute in parallel with the interruption process. The interruption process polls or otherwise monitors the redundant drives and, upon detecting the creation of a file system by the installation process, the interruption process disables the backup drive from the redundant drive array. This has the effect of preventing synchronization of the primary and backup drives during the installation process. After the installation is completed on the primary drive by the installation process, the backup drive is re-enabled in the redundant drive array. The redundant drive array then detects that the primary drive and backup drive are out of sync and initiates a synchronization process. The result is a successfully installed OS on the primary drive and a backup drive mirrored to the primary drive.

The use of the described method provides an efficient installation of a clean version of the OS. The number of synchronization processes between the redundant drives is reduced to one that occurs after the OS has been installed, thereby improving the functioning of the computing device. When the described method is implemented on a large group of computers (e.g., a server farm, etc.), it provides a predictable, reliable installation process that may be executed efficiently across the entire group of computers. Further, eliminating the potential for synchronization during the installation process may simplify and/or improve the user experience for users responsible for managing such a group of computers during a mass installation.

Figure 1:
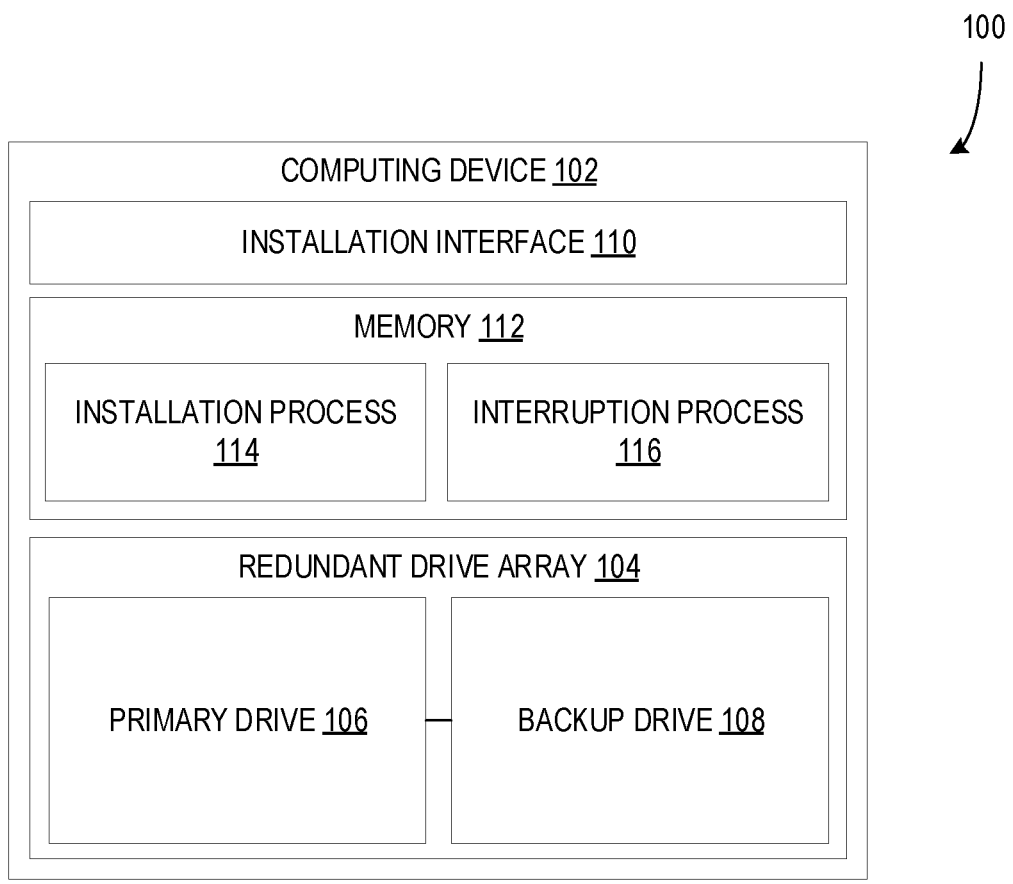
FIG. 1 is an exemplary block diagram illustrating a computing device configured to install an operating system on redundant drives according to an embodiment.

FIG. 1 is an exemplary block diagram 100 illustrating a computing device 102 configured to install an operating system on redundant drives 106 and 108 according to an embodiment. The computing device 102 includes a redundant drive array 104 for managing a primary drive 106 and a backup drive 108. The computing device 102 further includes an installation interface 110 and a memory 112 including an installation process 114 and an interruption process 116.

The computing device 102 is a computing apparatus, as described herein and/or as understood by a person of ordinary skill in the art, configured to enable the installation of an OS as described herein. In some examples, the computing device 102 includes a personal computer, server device, laptop, tablet, mobile device, wearable device, or the like.

While FIG. 1 includes a single computing device 102, alternative examples may include a system of more and/or differently arranged computing devices without departing from the description herein. For instance, computing device 102 may be in communication with one or more other computing devices via a network interface (e.g., the computing device 102 is a client device connected via a network to a server device, etc.). Further, the computing device 102 may include kernel software, firmware, drivers, or the like that enable the computing device 102 to interact with the installation interface 110, memory 112, redundant drive array 104, and the associated drives 106 and 108 as described herein.

The redundant drive array 104 is a component of the computing device 102 configured to monitor commands for writing to and/or reading from the associated drives (e.g., primary drive 106 and backup drive 108, etc.) and, in response to the monitored commands, enforce mirroring and/or synchronization of the data on both drives. The redundant drive array 104 may include software, firmware, and/or hardware components configured to enable the processes and/or operations described herein. In some examples, the redundant drive array 104 is a Redundant Array of Independent Disks (RAID) as understood by a person of ordinary skill in the art. Redundant drive arrays provide improved security of the data stored thereon, preventing loss of data in the case of failure of one of the drives. Further, redundant drive arrays may provide improved hard drive performance with respect to reading and/or writing data. While the computing device 102 and, specifically, the redundant drive array 104 include two drives, it should be understood that, in other examples, computing devices may include more and/or differently arranged drives without departing from the description herein.

Primary drive 106 and backup drive 108 may include physical hard drive devices, virtual drives, or a combination thereof. In some examples, the drives 106 and 108 may include various partitions (e.g., a boot partition, root partition, application partition, etc.). The partitions and other data on the drives may be edited, deleted, and/or replaced during the installation operations described herein. Boot partitions may include data required for booting up the associated computing device. For instance, a boot partition may include a bootloader (e.g., software responsible for booting the operating system of the computing device, such as the Grand Unified Bootloader (GRUB), etc.). Other boot partition data may include kernel files, hardware initialization files, and other associated boot data. Root partitions include the top level of the file directory of the system and may further include files and data associated with the operating system and/or other core system functionality. Application partitions include data and files associated with applications installed or otherwise stored on the drive.

In some examples, a user (e.g., an engineer, technician, etc.) may install a new OS, updated version of a current OS, or the like. The installation process, as described herein, includes installing the new OS onto one of the primary drive 106 of the computing device 102 while the backup drive 108 is disabled. Once the installation to the primary drive 106 is complete, the installation process may include mirroring the new OS onto the backup drive 108 by the redundant drive array 104.

The installation interface 110 may include a user interface, network interface, or other computer interface (e.g., a disk drive, virtual disk drive, etc.) configured for communicating installation data (e.g., executable installation files, kickstart files, installation script data, etc.) to the computing device. For instance, a user may initiate the installation of an OS by placing an installation disk (e.g., a floppy disk, a compact disk (CD), a digital versatile disk (DVD), etc.) in an associated drive interface of the computing device 102. Alternatively, or additionally, a user may cause the computing device 102 to initiate the installation of the OS via a network connection to a server device, or by using a virtual installation disk image file stored on the computing device 102. The installation interface 110 may include one or more of the described interfaces (e.g., a DVD interface initiates the installation of the OS and causes the computing device 102 to retrieve a portion of associated installation files from a data source via a network connection over a network interface, etc.). A network associated with the installation interface 110 may include the Internet, a private intranet, a combination of different networks, or the like.

In an example, the computing device 102 is a client device located at a site and configured to automatically collect data (e.g., credit card transaction data, etc.), execute applications, scripts, or the like, and/or communicate data to and from a server device and/or other client devices. An associated server device may be configured to communicate with and manage client devices via a network (e.g., using a network interface of the installation interface 110 of the computing device 102, etc.). The server device may be used to collect transaction data, logs, and/or performance data from the computing device 102, and/or reconfigure, install, or update software on the computing device 102 (e.g., installing an OS via the installation process 114 and interruption process 116, etc.). The computing device 102 may be configured to be managed by such a server device over a network or via on-site user interfaces (e.g., keyboard, mouse, display screen, etc.). However, in some examples, the computing device 102 may lack some or all on-site user interfaces, such that management is only possible through the use of a server device or other device connected via a network.

The memory 112 includes random access memory (RAM) and/or other similar memory used by the computing device 102 to store and interact with data associated with the applications, scripts and/or other processes currently being executed by the computing device 102. The installation process 114 and interruption process 116 may be one or more currently running applications, scripts, and/or other types of computer programs as understood by a person of ordinary skill in the art. The installation process 114 and interruption process 116 may further be configured to operate in parallel on the computing device 102 as described in greater detail below.

Figure 2:
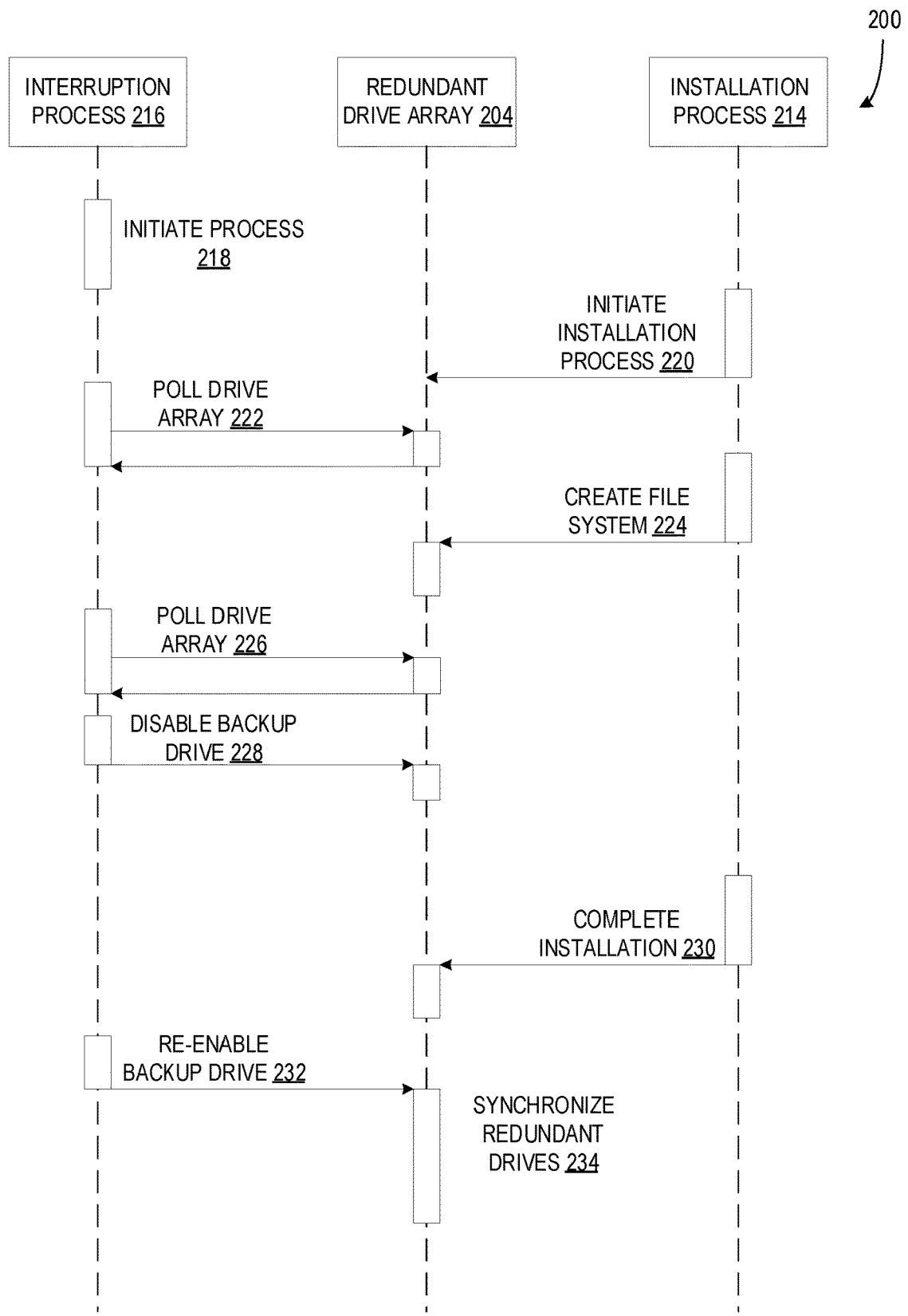
FIG. 2 is an exemplary sequence diagram illustrating operations of an interruption process and an installation process during installation of an operating system according to an embodiment.

FIG. 2 is an exemplary sequence diagram 200 illustrating operations of an interruption process 216 and an installation process 214 during installation of an operating system according to an embodiment. The interruption process 216 and installation process 214 interact with a redundant drive array 204 during the described sequence.

In some examples, the interruption process 216 and installation process 214 are initiated based on a bootloader component, a kickstart file component, or a combination thereof. For instance, the interruption process 216 may be based on a script in a kickstart file (e.g., a file stored in an installation partition and/or configured to initiate the installation of the OS as described herein, etc.) that is initiated as a background process prior to the beginning of the installation process. Additionally, or alternatively, a bootloader component of the computing device 102 may be configured to cause or otherwise enable the interruption process 216 and/or installation process 214 to operate as described herein (e.g., the bootloader may be configured to include an installation option for the OS that may be selected by a user, etc.). In an example, the bootloader (e.g., the Grand Unified Bootloader (GRUB), etc.) is updated with the installation option using, at least in part, the exemplary code commands shown below.

```
cat >>/etc/grub.conf <<EOF
title Linux 7.3 Installation
root (hd0,7)
kernel/isolinux/vmlinuz linux
inst.stage2=hd:sda8:/LiveOS/squashfs.img
ks=hd:sda8:/mip-ks.cfg inst.repo=hd:sda8:/
initrd/isolinux/initrd.img
EOF
```

At 218, the interruption process 216 is initiated. At 220, the installation process 214 is initiated. The installation process 214 may begin interacting with the redundant drive array 204 to perform the installation. The processes 216 and 214 operate in parallel, enabling the interruption process 216 to monitor the progress of the installation process 214 in installing the OS. The installation process may include transferring installation data configured to install the OS to the memory and/or drives of the computing device. The installation data may be mounted on an installation partition of the one or more of the drives of the computing device. Further, the installation data may include an image file for installation of the second OS, a kickstart file, installation scripts, backed up data from the previous OS installation, etc.

At 222, the interruption process 216 begins polling the redundant drive array to detect the creation of a file system associated with the operating system on the drives of the redundant drive array 204. In the illustrated sequence, at 222, the file system has not been created yet, so the interruption process does not detect a file system and will continue polling periodically as described herein. In an example, the interruption process 216 includes a script for polling a drive of the drive array using, at least in part, exemplary UNIX commands below.

```
while true
do
  ls/dev/|grep –w md0
  if [\$?–eq 0]
  then
    mdadm –manage/dev/md0 –f/dev/sdb2
  else
    sleep 5
  fi
done
```

In the exemplary commands, the "ls" command searches for the presence of a device labeled "md0", which will represent a drive of the computing device 102 when the installation process 214 begins to set up the device system and file system of the OS. If the "md0" device is found, the script runs an "mdadm" command ("mdadm" is a software utility for managing and monitoring RAID devices) with a "–f" flag (–f as used in the shown mdadm command is a "fail flag"), causing the backup drive, labeled "sdb2", to be disabled (e.g., marking the backup drive as faulty, or failing the backup drive, etc.). If the "md0" device is not found, the interruption process 216 runs a "sleep 5" command, causing the process 216 to wait for 5 seconds before attempting to find the "md0" device again based on the "while" loop.

At 224, the installation process 214 initiates the creation of a file system on one or more drives of the redundant drive array 204. With respect to the exemplary commands above, the installation process 214 may cause a device reference label "md0" to be created in order to begin setting up the file system of the OS. The file system of the OS may include one or more partitions, configuration files associated with the operations of the OS, default and/or core applications of the OS, etc. The process or creating the file system of the OS by the installation process 214 may include any combination of sub-processes as would be understood by a person of ordinary skill in the art without departing from the description herein. For instance, different software, firmware, and/or hardware configurations may call for alternative partition configurations. One partition configuration may be used with a system configured for use with a legacy firmware mode, while a different partition configuration may be used when the system is configured with an extensible firmware interface (EFI) or other similar firmware configurations.

In some examples, the new OS is configured to be installed on two drives mirrored with a redundant drive array. In order to correctly install the new OS on the primary drive 106 while the backup drive 108 is disabled, the primary drive 106 may be formatted to include partitions for first and second redundant virtual drives. The new OS is installed on the new partitions of the primary drive 106 as a first virtual drive and a second virtual drive. Further, an installation partition, or install partition, may be created to store backup data from a previous installation on the drive, an image file of the new OS (e.g., a .iso file, etc.), a kickstart file or data used during installation, scripts that are needed for the installation, etc.

For instance, exemplary code commands for configuring the installation partition are provided below, including copying an installation image and a kickstart file to the installation partition, as well as configuring a virtual compact disk drive directory (/cdrom) for mounting the installation image.

```
mkfs.ext2/dev/sda8
mkdir/osinstall
mount/dev/sda8/osinstall
cp installation.iso/osinstall/
cp kickstart.cfg/osinstall/
mkdir /cdrom
mount –o loop installation.iso/cdrom
cp –R/cdrom/*/osinstall/
```

At 226, the interruption process 216 polls the redundant drive array 204 to detect the creation of a file system again. In this case, the creation of the file system has been initiated by the installation process 214 since the last polling. The interruption process 216 detects the creation of and/or the presence of a file system on at least one of the drives of the redundant drive array 204. As a result of detecting the file system, the interruption process 216 disables the backup drive of the redundant drive array at 228 (e.g., via a "mdadm –f" command as described above, etc.).

At 230, the installation process 214 completes the installation of the operating system onto the primary drive of the redundant drive array 204. The completion of the installation may involve any OS installation operations as would be understood by a person of ordinary skill in the art without departing from the description here. For instance, the installation process 214 may include configuring a plurality of partitions associated with the OS on the primary drive of the redundant drive array 204, whereby the computing device is enabled to boot to the OS on the primary drive. Further operations may include installing hardware drivers, configuring default settings of the OS, gathering preference information from a user, identifying version updates of software applications and updating the software applications, etc.

At 232, the backup drive of the redundant drive array 204 is re-enabled after the installation is completed. At 234, the redundant drives of the redundant drive array 204 are synchronized. The backup drive may be re-enabled by a command of the interruption process 216 or based on input from a user of the computing device after the installation is complete. In some examples, re-enabling the backup drive may include use of a command code like the example below.

mdadm –manage/dev/md0 –a/dev/sdb2

Similar to the example code described previously, the above line of code includes an "mdadm" command with an "–a" flag for adding the "sdb2" device back to the redundant drive array 204.

In some examples, the computing device may reboot during the installation process at one or more times, including after the installation is complete. The re-enabling of the backup drive at 232 may be triggered based on detecting, for instance, the rebooting of the computing device after the completion of the installation.

Synchronization of the primary drive and backup drive of the redundant drive array 204 may occur based on the functionality of the redundant drive array 204 and may include any and/or all synchronization operations as would be understood by a person of ordinary skill in the art without departing from the description herein.

It should be understood that code commands provided herein are merely examples and not limiting. More, fewer, equivalent, or different code commands may be used to implement the described methods without departing from the scope of the disclosure.

Figure 3:
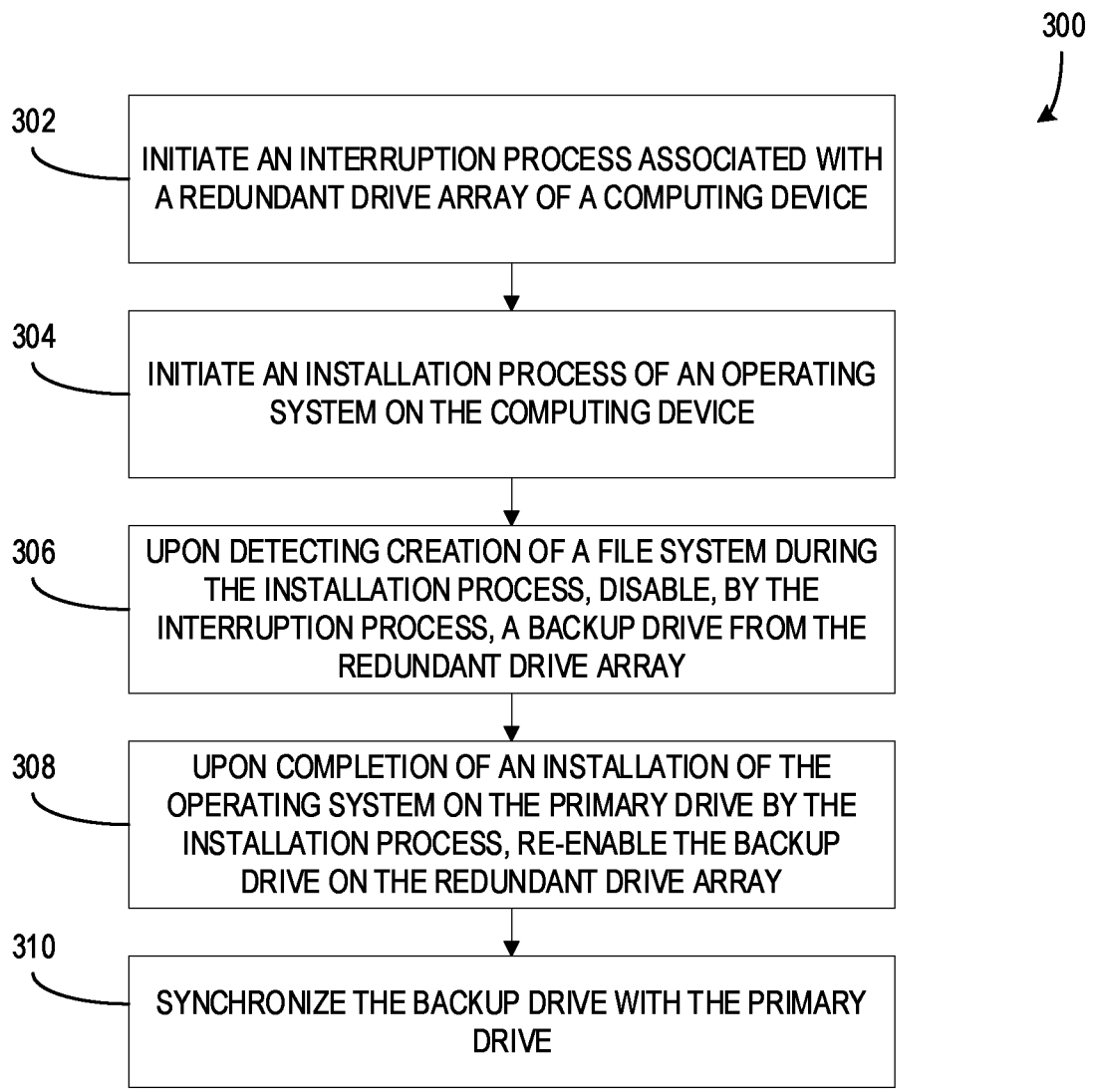
FIG. 3 is an exemplary flow chart illustrating installation of an operating system on redundant drives of a drive array according to an embodiment.

FIG. 3 is an exemplary flow chart 300 illustrating installation of an operating system on redundant drives of a drive array according to an embodiment.

At 302, an interruption process associated with a redundant drive array of a computing device is initiated. At 304, an installation process of an operating system is initiated on the computing device. The interruption process and installation process may be configured to run in parallel on one or more processors of the computing device. In some examples, a computing device may include multiple redundant drive arrays and/or more than backup drive in a redundant drive array. In cases where there are multiple backup drives, multiple interruption processes may be initiated, with each interruption process being configured to poll a drive array and disable one of the multiple backup drives. Alternatively, or additionally, a single interruption process may be configured to disable multiple backup drives during an installation process as described herein.

At 306, upon detecting creation of a file system during the installation process, the interruption process disables a backup drive from the redundant drive array. As described above, the detection of the creation of the file system include polling the drive(s) of the redundant drive array. Alternatively, other methods of detection may be used, such as configuring the installation process 214 to notify the interruption process 216 of the status of the installation process 214 and/or configuring the redundant drive array 204 to provide similar notifications.

At 308, upon completion of the installation of the operating system on a primary drive by the installation process, the backup drive is re-enabled in the redundant drive array. At 310, the backup drive is synchronized with the primary drive.

Figure 4:
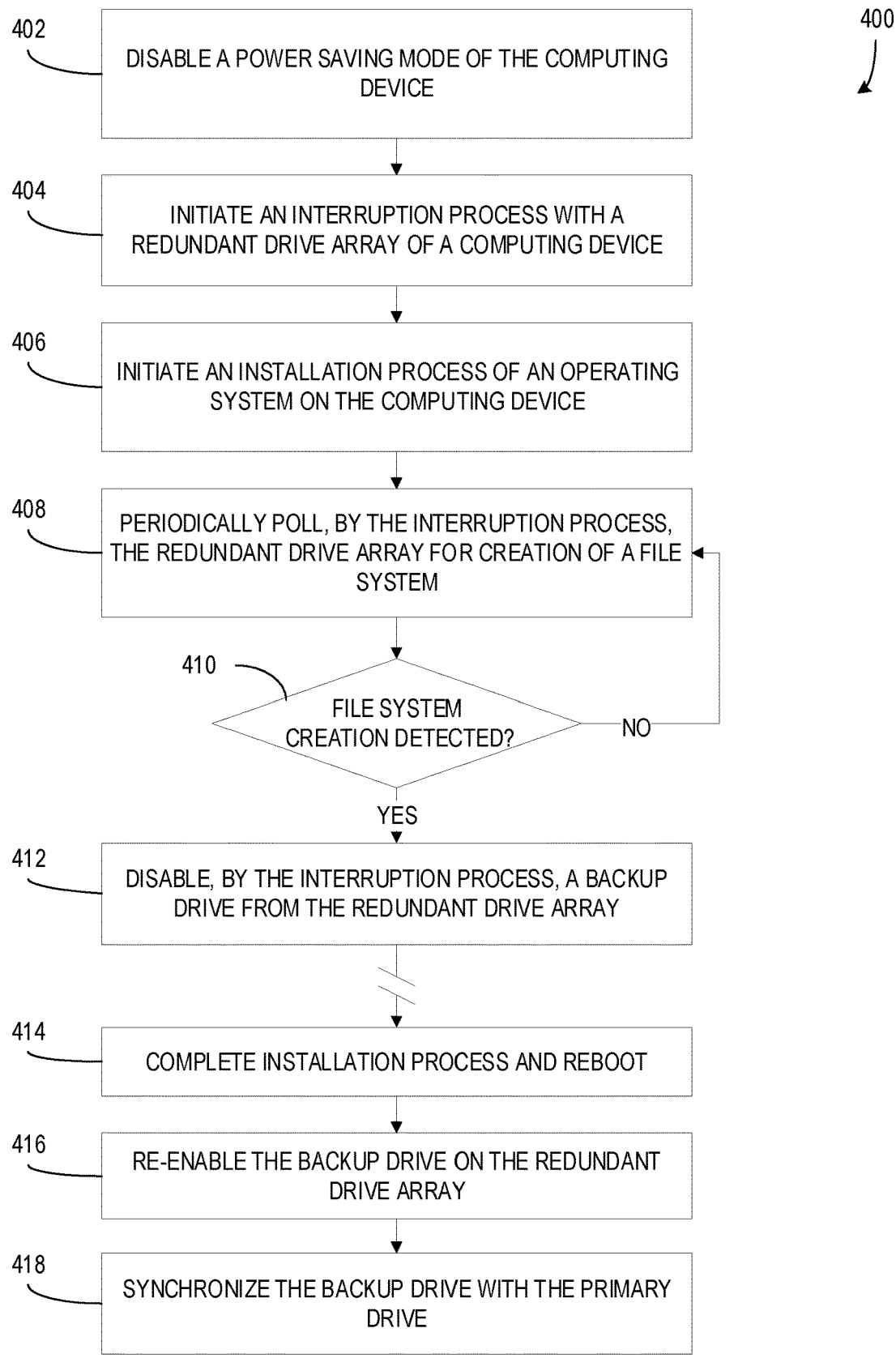
FIG. 4 is an exemplary flow chart illustrating installation of an operating system on redundant drives of a computing device including polling for creation of a file system and disabling a backup drive in response to a detected file system according to an embodiment.

FIG. 4 is an exemplary flow chart 400 illustrating installation of an operating system on redundant drives of a computing device including polling for creation of a file system and disabling a backup drive in response to a detected file system according to an embodiment.

At 402, a power saving mode of the computing device is disabled. In some examples, a bootloader configuration file or other associated file may be reconfigured to include a line of code for disabling a power saving mode. Such lines of code may be specific to the configuration of the computing device and/or associated software, firmware, or the like. For example, in a computing device configured to make use of an Extensible Firmware Interface (EFI), the line of code "powersave=off" may be included in the bootloader configuration file. Alternatively, in a computing device configured to make use of a Legacy interface, the line of code "acpi=off" may be included the bootloader configuration file (wherein ACPI stands for Advanced Configuration and Power Interface, etc.). Disabling a power saving mode of the computing device may promote faster processing and more efficient memory use during the installation process.

At 404 and 406, the interruption process and installation process are initiated as described above with respect to FIGS. 2 and 3.

At 408, the interruption process periodically polls the redundant drive array for creation of a file system. If, at 410, no file system creation is detected, the interruption process will continue to poll the redundant drive array periodically. The interruption process may be configured to poll every time a defined period of time passes (e.g., 5 seconds, 10 seconds, 2 seconds, etc.).

If, at 410, the file system creation is detected, the interruption process disables a backup drive from the redundant array at 412. Disabling the backup drive may be performed as described above with respect to FIGS. 2 and 3.

At 414, the installation process completes and the computing device reboots. At 416, the backup drive is re-enabled in the redundant drive array. The re-enabling of the backup drive may be done by the interruption process or another process related thereto. Re-enabling the backup drive may be triggered based on the completion of the installation process, rebooting the computing device, or a combination of the two.

At 418, the backup drive is synchronized with the primary drive. In some examples, the redundant drive array is configured to synchronize the primary drive and backup drive when changes are made to one or the other. The synchronization at 418 may be performed by a synchronization process of the redundant drive array.

Additional Example Scenarios

Aspects of the disclosure enable various additional scenarios, such as next described.

In an example, a user initiates an installation of a LINUX OS on a computing device. The computing device includes mirrored drives as described herein. The client device initiates an interruption process associated with the redundant drive array of the mirrored drives based on a script in an associated kickstart file. Then, the installation process is initiated, the installation process operating to install the LINUX OS onto the mirrored drives such that the computing device is configured to boot into the LINUX OS from the mirrored drives. The interruption process periodically polls the mirrored drives to detect the creation of a file system thereon. The first two instances of polling by the interruption process reveal that the installation process has not yet created the file system to a sufficient degree. The third instance of polling by the interruption process detects the creation of the file system on the primary drive of the mirrored drives and, as a result, disables a backup drive of the mirrored drives. The disabled backup drive is ignored by the installation process for the remainder of the installation, such that the backup drive is not synchronized with the primary drive during the installation. After the installation is complete, the computing device reboots, and, upon detecting the completion of the installation and the imminent reboot, the interruption process causes the backup drive to be re-enabled in the redundant drive array after the reboot is complete. The redundant drive array then detects that the backup drive is out of sync with the primary drive and causes the backup drive to be synchronized with the primary drive, such that the data written to the primary drive during the installation is copied to the backup drive.

In an alternative example, after the installation is complete and the system reboots, the user may be prompted or otherwise instructed to re-enable the backup drive on the redundant drive array. The user may enter commands or otherwise interact with the computing device to re-enable the backup drive and cause the backup drive to be automatically synchronized with the primary drive.

Exemplary Operating Environment

Figure 5:
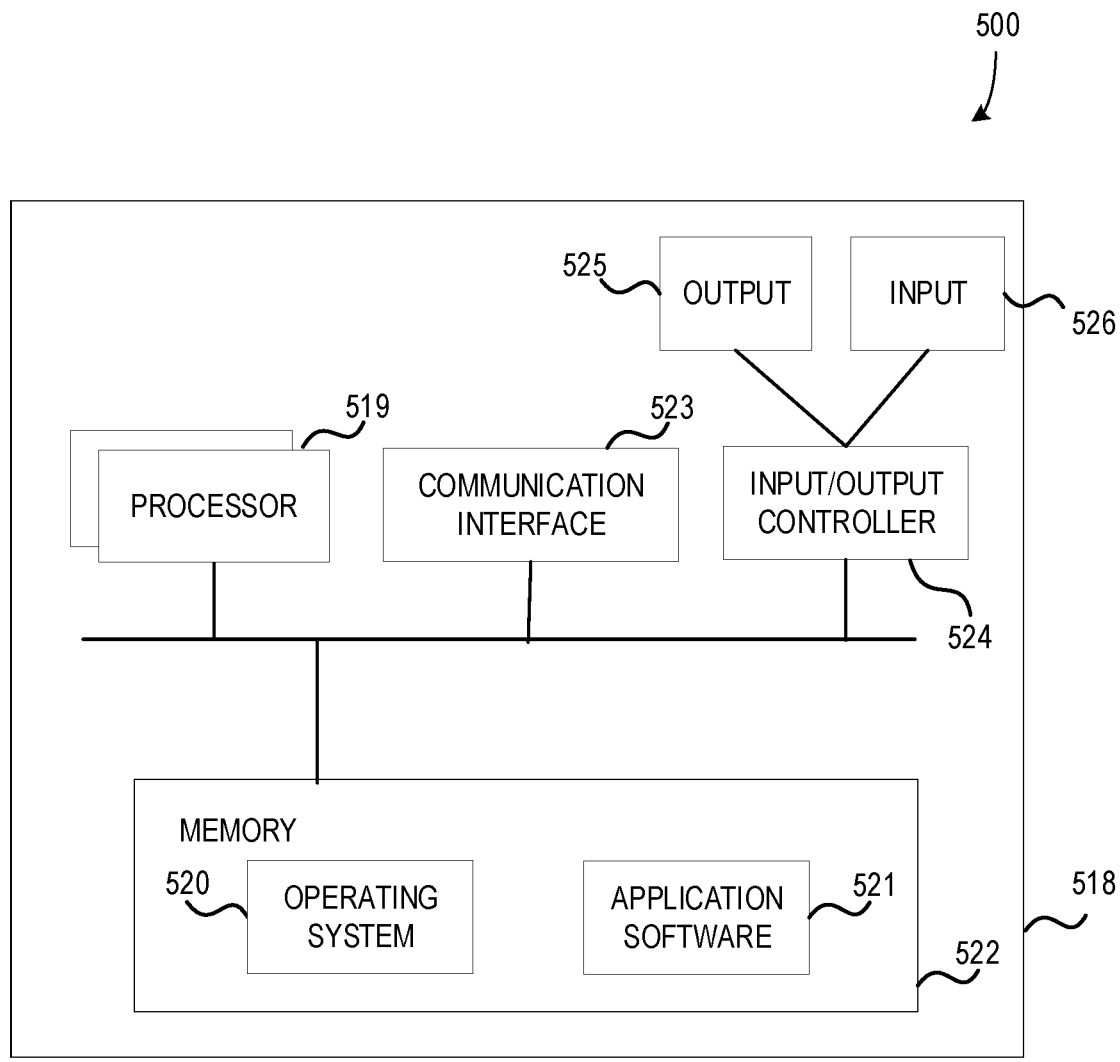
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, installing an OS on a system including multiple redundant drives may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following features:

A system for installing operating system (OS) software on a computing device with multiple redundant drives comprising:
at least one processor;
a primary drive and a backup drive, the primary drive and backup drive mirrored via a redundant drive array; and
at least one memory comprising computer program code, the at least one memory and the computer program code configured to, with the at least one processor, cause the at least one processor to:
initiate an interruption process associated with the redundant drive array;
initiate an installation process of the operating system on the computing device;
upon detecting creation of a file system during the installation process, disable, by the interruption process, the backup drive from the redundant drive array;
upon completion of an installation of the operating system on the primary drive by the installation process, re-enable the backup drive on the redundant drive array; and
synchronize the backup drive with the primary drive.
wherein detecting creation of the file system includes periodically polling for presence of a file system throughout the installation process.
wherein disabling the backup drive includes marking the backup drive as failed using a fail flag.
wherein the system includes a second redundant drive array including a plurality of redundant drives.
wherein the at least one memory and the computer program code configured to, with the at least one processor, further cause the at least one processor to:
initiate a second interruption process associated with the second redundant drive array;
upon detecting creation of a file system on the second redundant drive array during the installation process, disable, by the second interruption process, at least one drive from the second redundant drive array;
upon completion of an installation of the operating system on the second redundant drive array by the installation process, re-enable the disabled at least one drive on the second redundant drive array; and
synchronize drives of the second redundant drive array.
wherein the primary drive and the backup drive are physical drives.
wherein the primary drive and the backup drive are virtual drives.
wherein the at least one memory and the computer program code are configured to, with the at least one processor, further cause the at least one processor to disable a power saving mode of the computing device prior to initiating the installation process of the operating system.
wherein the redundant drive array is a Redundant Array of Independent Disks (RAID).

A computerized method for installing operating system (OS) software of a computing device with multiple redundant drives, the method comprising:
initiating, by a processor, an interruption process associated with a redundant drive array, the redundant drive array including a primary drive mirrored with a backup drive;
initiating, by the processor, an installation process of the operating system on the computing device;
upon detecting creation of a file system during the installation process, disabling, by the interruption process, the backup drive from the redundant drive array;
upon completion of an installation of the operating system on the primary drive by the installation process, re-enabling, by the interruption process, the backup drive on the redundant drive array; and
synchronizing, by the processor, the backup drive with the primary drive.
wherein the primary drive and the backup drive are physical drives.
wherein the primary drive and the backup drive are virtual drives.
further comprising disabling a power saving mode of the computing device prior to initiating the installation process of the operating system.
wherein the redundant drive array is a Redundant Array of Independent Disks (RAID).

One or more computer storage media having computer-executable instructions for installing operating system (OS) software of a computing device with multiple redundant drives that, upon execution by a processor, cause the processor to at least:
initiate an interruption process associated with a redundant drive array, the redundant drive array including a primary drive mirrored with a backup drive;
initiate an installation process of the operating system on the computing device;
upon detecting creation of a file system during the installation process, disable, by the interruption process, the backup drive from the redundant drive array;
upon completion of an installation of the operating system on the primary drive by the installation process, re-enable, by the interruption process, the backup drive on the redundant drive array; and
synchronize the backup drive with the primary drive.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for installing an OS on a device with multiple redundant drives, including means for initiating an interruption process associated with a redundant drive array, the redundant drive array including a primary drive mirrored with a backup drive, means for initiating an installation process of the operating system on the computing device, means for disabling, by the interruption process, the backup drive from the redundant drive array upon detecting creation of a file system during the installation process, means for re-enabling the backup drive on the redundant drive array upon completion of the installation of the operating system on the primary drive, and means for synchronizing the backup drive with the primary drive. The illustrated one or more processors 519 together with the computer program code stored in memory 522 constitute exemplary processing means for installing an OS on one drive of multiple redundant drives and later synchronizing the other drive(s) of the multiple redundant drives with the one drive.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for installing an operating system (OS) on a computing device with multiple redundant drives comprising:
   at least one processor;
   a primary drive and a backup drive, the primary drive and backup drive mirrored via a redundant drive array; and
   at least one memory comprising computer program code, the at least one memory and the computer program code configured to, with the at least one processor, cause the at least one processor to:
      initiate, in parallel, an interruption process associated with the redundant drive array and
      an installation process of the operating system on the computing device;
      upon detecting creation of a file system during the installation process, disable, by the interruption process, the backup drive from the redundant drive array;
      upon completion of an installation of the operating system on the primary drive by the installation process, re-enable the backup drive on the redundant drive array; and
      synchronize the backup drive with the primary drive.

2. The system of claim 1, wherein detecting creation of the file system includes periodically polling for presence of a file system throughout the installation process.

3. The system of claim 1, wherein disabling the backup drive includes marking the backup drive as failed using a fail flag.

4. The system of claim 1, wherein the system includes a second redundant drive array including a plurality of redundant drives; and
   wherein the at least one memory and the computer program code configured to, with the at least one processor, further cause the at least one processor to:
   initiate a second interruption process associated with the second redundant drive array;
   upon detecting creation of a file system on the second redundant drive array during the installation process, disable, by the second interruption process, at least one drive from the second redundant drive array;
   upon completion of an installation of the operating system on the second redundant drive array by the installation process, re-enable the disabled at least one drive on the second redundant drive array; and
   synchronize drives of the second redundant drive array.

5. The system of claim 1, wherein the primary drive and the backup drive are physical drives.

6. The system of claim 1, wherein the primary drive and the backup drive are virtual drives, wherein the primary drive is formatted to include partitions for a first and second redundant virtual drives, wherein the operating system is installed on the first and second redundant virtual drives.

7. The system of claim 1, the at least one memory and the computer program code configured to, with the at least one processor, further cause the at least one processor to disable a power saving mode of the computing device prior to initiating the installation process of the operating system.

8. The system of claim 1, wherein the redundant drive array is a Redundant Array of Independent Disks (RAID).

9. A computerized method for installing operating system (OS) software of a computing device with multiple redundant drives, the method comprising:

initiating, by a processor, an interruption process associated with a redundant drive array, the redundant drive array including a primary drive mirrored with a backup drive;

initiating, by the processor, an installation process of the operating system on the computing device;

upon detecting creation of a file system during the installation process, disabling, by the interruption process, the backup drive from the redundant drive array;

upon completion of an installation of the operating system on the primary drive by the installation process, re-enabling, by the interruption process, the backup drive on the redundant drive array; and synchronizing, by the processor, the backup drive with the primary drive.

10. The computerized method of claim 9, wherein detecting creation of the file system includes periodically polling for presence of a file system throughout the installation process.

11. The computerized method of claim 9, wherein disabling the backup drive includes marking the backup drive as failed using a fail flag.

12. The computerized method of claim 9, further comprising:

initiating a second interruption process associated with a second redundant drive array;

upon detecting creation of a file system on the second redundant drive array during the installation process, disabling, by the second interruption process, at least one drive from the second redundant drive array;

upon completion of the installation of the operating system on the second redundant drive array by the installation process, re-enabling the disabled at least one drive on the second redundant drive array; and synchronizing drives of the second redundant drive array.

13. The computerized method of claim 9, wherein the primary drive and the backup drive are physical drives.

14. The computerized method of claim 9, wherein the primary drive and the backup drive are virtual drives.

15. The computerized method of claim 9, further comprising disabling a power saving mode of the computing device prior to initiating the installation process of the operating system.

16. The computerized method of claim 9, wherein the redundant drive array is a Redundant Array of Independent Disks (RAID).

17. One or more computer storage media having computer-executable instructions for installing operating system (OS) software of a computing device with multiple redundant drives that, upon execution by a processor, cause the processor to at least:

initiate an interruption process associated with a redundant drive array, the redundant drive array including a primary drive mirrored with a backup drive;

initiate an installation process of the operating system on the computing device;

upon detecting creation of a file system during the installation process, disable, by the interruption process, the backup drive from the redundant drive array;

upon completion of an installation of the operating system on the primary drive by the installation process, re-enable, by the interruption process, the backup drive on the redundant drive array; and synchronize the backup drive with the primary drive.

18. The one or more computer storage media of claim 17, wherein detecting creation of the file system includes periodically polling for presence of a file system throughout the installation process.

19. The one or more computer storage media of claim 17, wherein disabling the backup drive includes marking the backup drive as failed using a fail flag.

20. The one or more computer storage media of claim 17, the computer-executable instructions, upon execution by a processor, further causing the processor to:

initiate a second interruption process associated with a second redundant drive array;

upon detecting creation of a file system on the second redundant drive array during the installation process, disable, by the second interruption process, at least one drive from the second redundant drive array;

upon completion of the installation of the operating system on the second redundant drive array by the installation process, re-enable the disabled at least one drive on the second redundant drive array; and synchronize drives of the second redundant drive array.

\* \* \* \* \*